C. A. WARD.
LUBRICATING MEANS AND PROCESS.
APPLICATION FILED JULY 1, 1919.
1,389,720.
Patented Sept. 6, 1921.
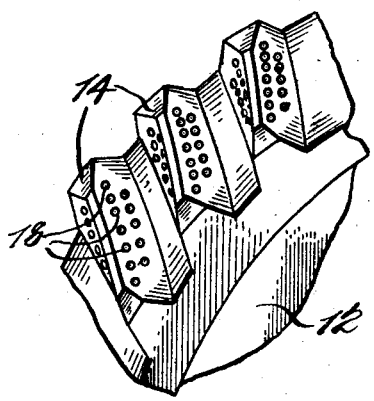
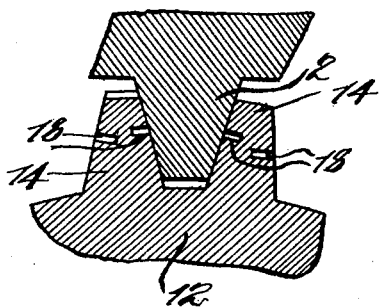
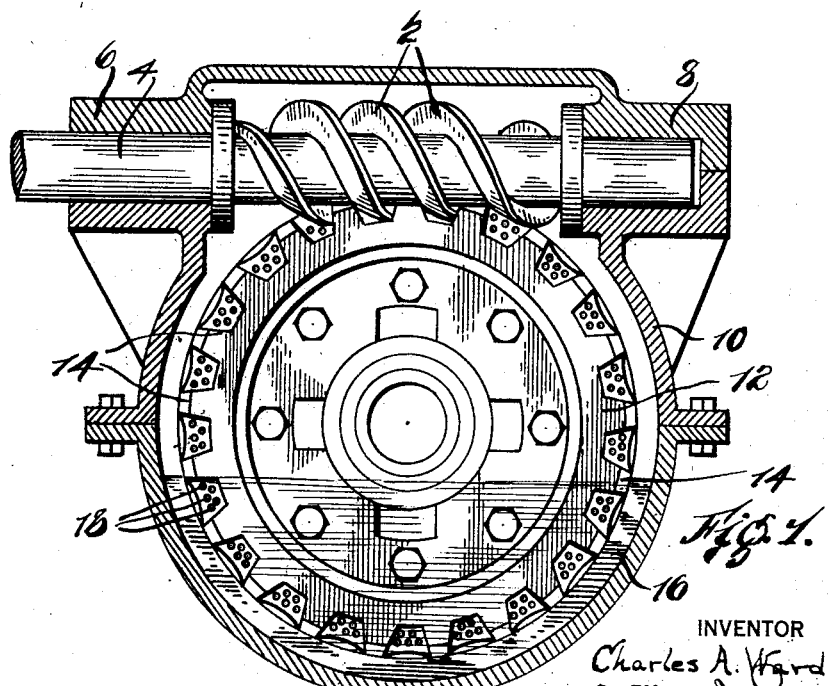
INVENTOR
Charles A. Ward
BY
ATTORNEY

UNITED STATES PATENT OFFICE.

CHARLES A. WARD, OF MOUNT VERNON, NEW YORK.

LUBRICATING MEANS AND PROCESS.

1,389,720. Specification of Letters Patent. Patented Sept. 6, 1921.

Application filed July 1, 1919. Serial No. 308,017.

*To all whom it may concern:*

Be it known that I, CHARLES A. WARD, a citizen of the United States, residing at Mount Vernon, New York, have invented certain new and useful Improvements in Lubricating Means and Processes, of which the following is a clear, full, and exact description.

This invention relates to lubrication, and particularly to the lubrication of engaging or bearing surfaces operating under high pressure, as, for example, in transmission of power mechanism, and is herein shown as embodied in and practised in connection with worm gear mechanism. It will be understood, however, that the invention is not restricted to the illustrated embodiment and use, and that many features of the invention are of general applicability in the art to which the invention relates.

A general object of the invention is to insure, both by a novel process of lubrication and by the employment of novel means, the maintenance of a separating film of lubricant between the coöperating or bearing surfaces of parts which engage under a comparatively high pressure, a particular object of the invention being the solution of the problem of effectively lubricating worm gear mechanism.

An important characteristic feature of the invention is the utilization of a number of individual masses of lubricant, confined except for small surface exposures at the surface to be lubricated, these masses providing a non-compressible backing and cohering surfaces for the lubricant film, thus not only acting to carry the lubricant between the surfaces to be lubricated but also serving to hold it in position between the surfaces.

Other objects, important features and advantages obtained from the practice of the process of the invention and by the utilization of the novel means disclosed will appear from the following description and claims when considered in connection with the accompanying drawings, in which—

Figure 1 is a side elevation of a worm gear transmission mechanism, the casing in which said gearing is confined and which serves also as a lubricant-containing casing, being shown in section;

Fig. 2 is an enlarged perspective detail of a portion of the toothed periphery of the gear wheel; and Fig. 3 is a sectional detail through the tooth or rib of the worm and two of the gear wheel teeth, showing particularly the location of the lubricant containing pockets.

In Fig. 1 of the drawings the worm having the usual spirally arranged worm teeth or ribs 2 is shown as formed upon a worm shaft 4 having bearings 6 and 8 in the upper part of a casing 10, which is shaped to receive also the gear wheel 12 having gear teeth 14 suitably shaped to coöperate with the teeth 2 of the worm. The casing 10 is also made to hold lubricant 16, in which the lower part of the worm wheel 12 runs.

From the foregoing description it will be seen that as the teeth 14 of the worm wheel 12 travel through the lubricant, they will gather up lubricant which will adhere in the form of a film upon the surface of the teeth, and this lubricant will serve to some extent to lubricate the engaging faces of the teeth 2 of the worm and the teeth 14 of the gear wheel. When these engaging surfaces are subjected to high pressure, however, as, for example, when mechanism like that herein shown and described is utilized for transmitting power from a motor or engine to the driving wheels of an automobile, the lubrication effected by the film of lubricant gathered up by the gear wheel is not usually sufficient, with the result that power is lost by friction and the life of the worm gear mechanism is reduced by wear.

To provide for the effective lubrication of the engaging surfaces of the worm and the gear wheel, and to maintain a separating film of lubricant between said surfaces, a number of fine holes 18 are drilled into the engaging faces of the teeth 14 of the gear wheel 12, these holes forming individual lubricant cups or pockets which serve not only to facilitate the gathering up of the lubricant as the gear wheel rotates through the lubricant supply 16, but also, by providing individual masses of lubricant, confined except for the surfaces exposed at the engaging surface of the gear tooth, they serve to afford cohering surfaces which not only act to carry the lubricant film between the surfaces to be lubricated but also hold said film in position between said surfaces. These cups or pockets being full of lubricant constituting a part of the lubricant spread out as a film between the working surfaces furnish an effective non-compressible backing for portions of the film over the mouths of said pockets.

Although the pockets 18 are shown as formed only in the engaging faces of the gear wheel teeth, it will be understood that they could equally as well be formed in the other member of the worm gear mechanism, suitable provision being made for supplying lubricant, and that the invention is also not necessarily restricted to provision of the pockets in only one of the engaging surfaces. It will also be understood that the invention is not restricted to use with worm gear mechanism but is equally useful for effecting the lubrication of any engaging or bearing surfaces, and particularly those which operate under high pressure.

What I claim as new is:

1. The process of lubricating engaging or bearing surfaces, which consists in exposing at the engaging surface of one of the engaging parts individual masses of liquid lubricant otherwise confined, and overfilling the confining means between engaging operations.

2. The process of lubricating engaging or bearing surfaces, for example, the engaging surface of the driving and driven members of transmission of power mechanism, which consists in providing a number of liquid tight cups or pockets of relatively small bore in the engaging face of one of said members and supplying said face and said cups or pockets with liquid lubricant in excess of that required to fill said cups or pockets before each operative engagement of said face with the coöperating surface of the other member.

3. The process of lubricating engaging or bearing surfaces, for example, the engaging surface of the driving and driven members of transmission of power mechanism, which consists in providing a number of cups or pockets of relatively small bore in the engaging face of one of said members and causing said face to travel through a supply of liquid lubricant before each operative engagement with the coöperating surface of the other member.

4. The process of lubricating worm gear mechanism, which consists in providing in the engaging faces of the teeth of the gear wheel a plurality of cups or pockets of relatively small bore and then causing said teeth to travel through a supply of liquid lubricant before engaging the worm.

5. Worm gear mechanism comprising a gear wheel and a worm, one of said parts having cups or pockets of relatively small bore formed in those gear faces which engage the coöperating faces of the other part, and lubricant supplying means arranged to supply lubricant to said pockets and to the adjacent bearing surface before each operative arrangement of the coöperating faces.

6. In transmission of power mechanism, a driving member and a driven member adapted to transmit the power by direct engagement of coöperating faces, one of said members being provided in its faces which engage the coöperating faces of the other member with liquid tight cups or pockets of relatively small bore, and means for supplying lubricant to said cups or pockets in excess of that required to fill them and to the adjacent bearing surface before each operative engagement of said coöperating faces.

7. The process of lubricating engaging or bearing surfaces, which consists in exposing at the engaging surface of one of the engaging parts individual masses of lubricant otherwise confined, and supplying lubricant to the confining means between the successive engaging operations in excess of that required to fill said confining means.

Signed at New York city, N. Y., this 23rd day of May, 1919.

CHARLES A. WARD.